United States Patent [19]

Fertig

[11] Patent Number: 5,231,770
[45] Date of Patent: Aug. 3, 1993

[54] TREATING DEVICE HAVING AN OPEN DESIGN FOR HUMAN HAIR OF THE HEAD

[75] Inventor: Werner Fertig, Bensheim, Fed. Rep. of Germany

[73] Assignee: Wella Aktiengesellschaft, Darmstadt, Fed. Rep. of Germany

[21] Appl. No.: 828,906
[22] PCT Filed: May 30, 1991
[86] PCT No.: PCT/EP91/01004
§ 371 Date: Jan. 30, 1992
§ 102(e) Date: Jan. 30, 1992
[87] PCT Pub. No.: WO91/18534
PCT Pub. Date: Dec. 12, 1991

[30] Foreign Application Priority Data

Jun. 7, 1990 [DE] Fed. Rep. of Germany ....... 4018186

[51] Int. Cl.⁵ ............................................ A45D 20/00
[52] U.S. Cl. ........................................ 34/1 W; 34/96; 219/415
[58] Field of Search ................... 34/4, 96, 97, 97, 202, 34/39, 1 W; 392/380, 412, 415, 407

[56] References Cited

U.S. PATENT DOCUMENTS 4,912,273  4/1990  Matsui ................................ 34/96 X Primary Examiner—Henry A. Bennet
Attorney, Agent, or Firm—Michael J. Striker

[57] ABSTRACT

A device for monitoring the position of the head is provided at a treatment device having an open design for human hair on the head, which device is outfitted with at least one transmitter and at least one receiver for generating and receiving a measurement signal 12, as well as a warning device for indicating undesired head positions.

15 Claims, 6 Drawing Sheets

TREATING DEVICE HAVING AN OPEN DESIGN FOR HUMAN HAIR OF THE HEAD

BACKGROUND OF THE INVENTION

The invention is directed to a treatment device having an open design for human hair of the head.

Such devices are e.g. infrared heating devices, drying hoods, steam devices or combinations of these devices. The head of a person to be treated should always be positioned centrally in a treatment device. This is advantageous for various reasons. On the one hand the time required for drying the hair is minimized and on the other hand a uniform action of chemical preparations, e.g. permanent wave compositions, is achieved.

It cannot be assumed with the known devices that the position of the head of a person to be treated is stationary during the treatment period. The freedom of movement in the head area which is comfortable for the client has the disadvantage for hair treatment that a uniform treatment is not necessarily achieved. In the most unfavorable case a client falls asleep during the relaxing treatment and the hair is located clearly closer to a part of the treatment device adjoining the head space than to the part lying opposite. Or the client will sit upright at first and then will bend forward later with the upper part of the body or adopt a sitting position close to a reclining position. In both cases the client leaves the optimal treatment area in both the horizontal and vertical directions.

SUMMARY OF THE INVENTION

The object of the invention is to provide a treatment device for human hair on the head which does not restrict the freedom of movement of the head of the person to be treated and in which a position of the head which is particularly favorable for the results of the treatment is nevertheless ensured in a fixed position area during the entire treatment period.

In keeping with these objects and with others which will become apparent hereinafter, one feature of the present invention resides, briefly stated, in a device for monitoring the position of the head, which is provided in the area of the treatment device and is outfitted with at least one transmitter and at least one receiver for generating and receiving a measurement signal and a warning device for indicating undesirable head positions.

The treatment device according to the invention does not limit the freedom of movement of the head during the hair treatment since a measurement signal is used for monitoring the head position. Accordingly, a movement space within which a uniform treatment result can be achieved can be provided during the entire treatment period. The use of the measurement signal makes it possible to indicate to the client herself or to a service person in the hairdressing salon all undesired head positions of the client which are not in the permissible movement space and if necessary to evaluate the measurement signal for a special further treatment.

Another feature of the present invention it is advantageous to outfit the treatment device with at least one reflector at which the measurement signal is deflected. Accordingly, a plurality of defining lines of the permissible movement space can be monitored with only one measurement signal. For example, a triangular line monitoring can be effected in a plane with two reflectors.

Tested and inexpensive radiators and sensors can be used in the treatment device according to the invention by using infrared radiation or an ultrasonic signal as measurement signal.

If the transmitter and receiver for the measurement signal are constructed in one structural component part, fewer structural component parts and wiring are needed and these sensors can be used as proximity switches while the object to be detected is used as a reflector.

By aligning the transmitter at an acute angle relative to the horizontal line and arranging a reflector in this direction so that the measurement signal is reflected back to the transmitter it is possible to locate the change in the position of the head in two directions facing one another at a right angle by means of one measurement signal. The path of a measurement signal radiated from bottom to top behind the head and extending close along the head is interrupted when the head is positioned too far to the rear as well as when it is positioned too far toward the top.

Exactly one movement direction can be monitored by a horizontal or vertical transmitter alignment. This has the advantage that changes in position in different directions can be indicated separately.

If the measurement signal is partially blanked out due to a reflector which is incompletely inserted in the radiated signal in such a way that the blanked out measurement signal undergoes a clear change in direction at this reflector, then two measurement signals can be generated from one measurement signal and positions can be located in different directions with these measurement signals.

It is possible to locate the position of the head by one measurement signal in both the horizontal and vertical direction in that the measurement signal is radiated in the horizontal direction, deflected partially diagonally upward out of the horizontal plane, and the deflected measurement signal is reflected above the head position downward to the hair. After the measurement signal is divided the horizontally sent signal component is used for horizontal delimitation of the permitted movement space. On the other hand, the deflected radiation component serves to measure the height of the head position. The height of the head can be determined according to different methods. When using an ultrasonic signal, for example, the propagation time of an ultrasonic pulse can be measured and in the case of infrared radiation a reflection angle can be measured over the radiation intensity.

As a result of the construction of the warning device serving to indicate unwanted head positions as an optical signal transmitter, the client and the service personnel of the hairdressing salon can be visually informed of deviations of the head position from the permitted position. If individual measurement signals are used to determine different positions it is possible to indicate every deviation in a determined direction by means of an optical signal transmitter. Accordingly all deviations, e.g. too high, too low, too far to the right, etc., can be detected individually.

The construction of the warning device as acoustic signal transmitter has the advantage that deviations in position can also be perceived by a client whose eyes are closed and by the service personnel when occupied in a distant location in the hairdressing salon without visual contact with the treatment device.

If a plurality of infrared transmitters are arranged adjacent to one another in a line at the treatment device and aligned with only one infrared receiver, then the instantaneous position of the head can be determined by measuring the radiation energy striking the infrared receiver.

If a plurality of infrared receivers are arranged next to one another in a line and only one infrared transmitter is aligned with the latter, then the information concerning the instantaneous head position is given as a result of whether or not the individual infrared receiver receives a signal from the infrared transmitter.

If the treatment device is an infrared heat treatment device the invention then already has a great advantage in that the freedom of movement for the person to be treated is particularly great in infrared heat treatment devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
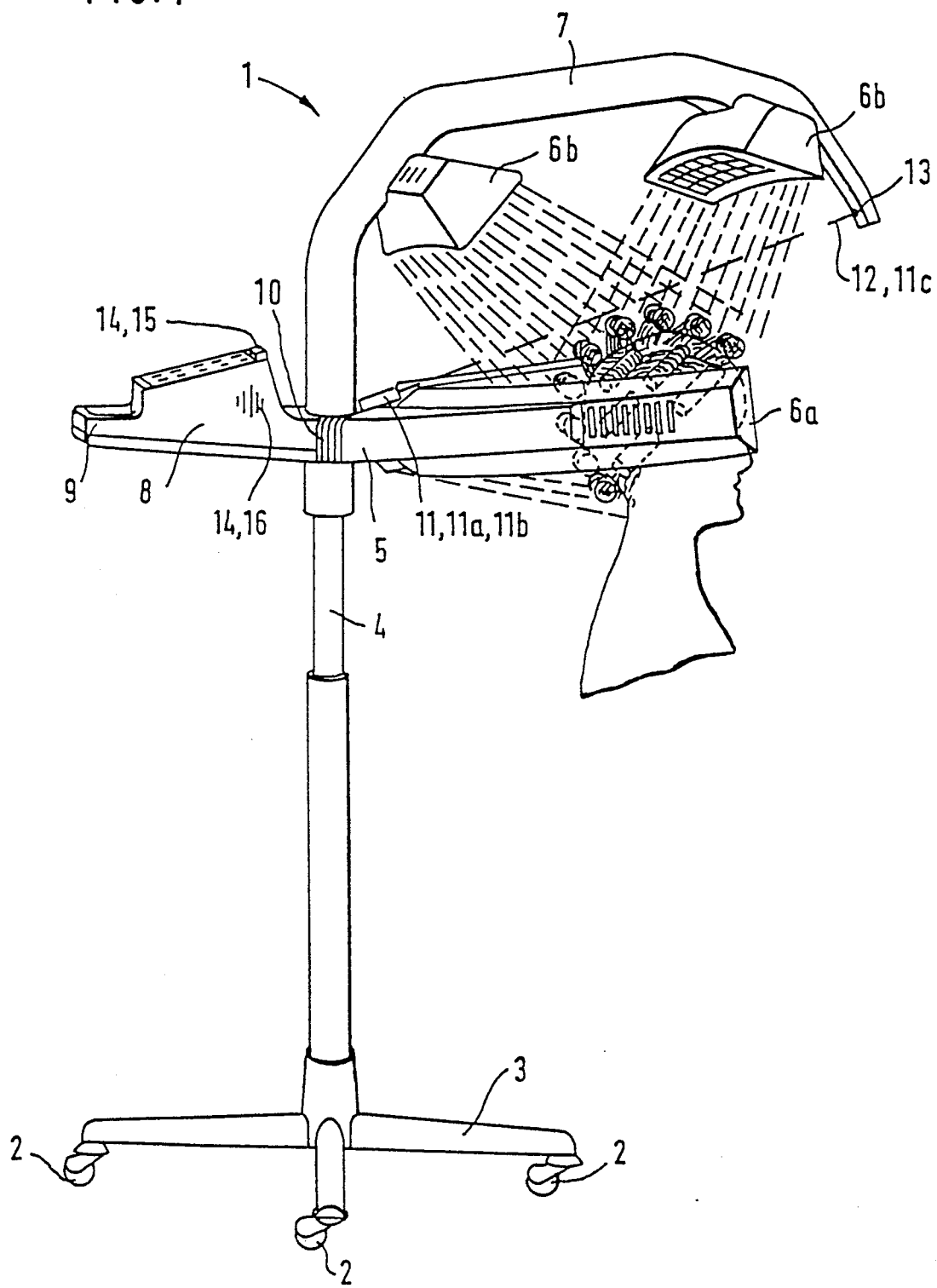
FIG. 1 shows a perspective view of a treatment device with four infrared radiators for heating the hair of the head and an infrared sensor which is aligned with a reflector.

The treatment device 1 has a cross stand 3 supported on rollers 2 on which a vertically aligned, longitudinally displaceable and axially rotatable pipe 4 is mounted (FIG. 1). Two side arms 5 with a horizontally radiating infrared radiator 6a fastened at each arm are arranged at the upper end of this pipe 4. A substantially horizontally projecting supporting arm 7 connected with two infrared radiators 6b which radiate downward diagonally is also fastened there. Moreover, an operator panel 8 is arranged at the upper end of the pipe 4.

A handle 9 which is fastened at the operator panel 8 facilitates the joint vertical adjustment and horizontal swiveling of the infrared radiators 6a and 6b. The side arms 5 can be folded together by means of an articulation 10 so as to achieve a small space requirement for the treatment device 1 when not in use.

The position of the head of a person to be treated is monitored with reference to two movement directions by the infrared radiation 11c of an infrared sensor 11. The infrared sensor 11 produces a measurement signal 12 which is thrown back to the infrared sensor 11 by the tip of the supporting arm 7 which is constructed as a reflector 13. If the head is positioned too high or the vertically adjustable part of the treatment device 1 is too low the measurement signal 12 is prevented from reaching the reflector 13 or the infrared sensor 11 apart from scatter radiation of low intensity. The same thing happens when the person's head reaches too far to the rear on the lower part of the supporting arm 7. The infrared sensor 11 containing an infrared transmitter 11a and an infrared receiver 11b then records a measurement signal which is too weak. This state is conveyed by a warning device 14 in the form of an optical signal transmitter 15 and an acoustic signal transmitter 16.

Figure 2:
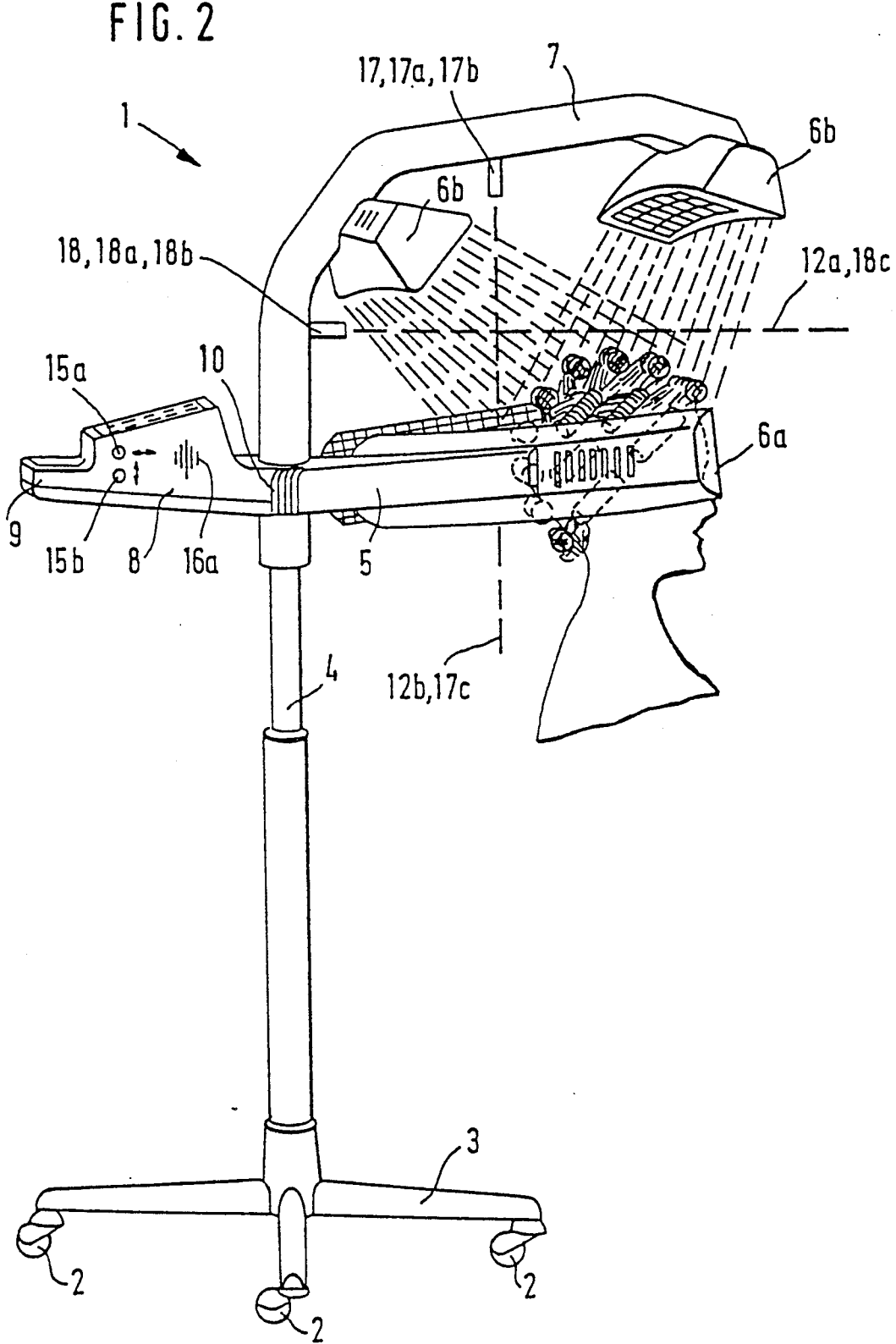
FIG. 2 shows a perspective view of a treatment device with two ultrasonic sensors, one of which is vertically aligned while the other is horizontally aligned.

FIG. 2 shows another construction of the treatment device 1 according to the invention. In this case, two ultrasonic sensors 17, 18 are fastened at the supporting arm 7 for locating the head position by means of ultrasonic signals 17c, 18c. The ultrasonic sensors 17, 18 have an ultrasonic transmitter 17a, 18a and an ultrasonic receiver 17b, 18b and are horizontally and vertically aligned in such a way that their measurement signals 12a, 12b run above and behind the head. However, a useful echo to be registered is only formed when the head attains the radiation area of the infrared radiator 6a, 6b in one of the two ultrasonic cones. The ultrasonic sensors 17, 18 work according to the method of measured time limitation. Their sonic converters transmit sonic pulse packets in periodic sequences; a portion of the sound from the latter arrives back again at the same converter after reflection. The sonic converter alternates constantly between transmission pulse radiation and echo reception. The echo detection is released shortly before the expected arrival of an echo produced by an incorrectly positioned head and the echo detector is blocked shortly after the arrival of the echo. All disturbing echoes not originating immediately in the area of the head can be ignored as a result of such measurement windows. A detected unwanted head position can be indicated by two optical signal transmitters 15a, 15b. One optical signal transmitter 15a indicates the signal of the ultrasonic sensor 17 for position monitoring in a horizontal direction and the other optical signal transmitter 15b indicates the signal of the ultrasonic sensor 18 for vertical monitoring. The illumination of the optical signal transmitters 15a, 15b when determining an undesirable head position is accompanied by the signal tone of an acoustic signal transmitter 16a.

Figure 3:
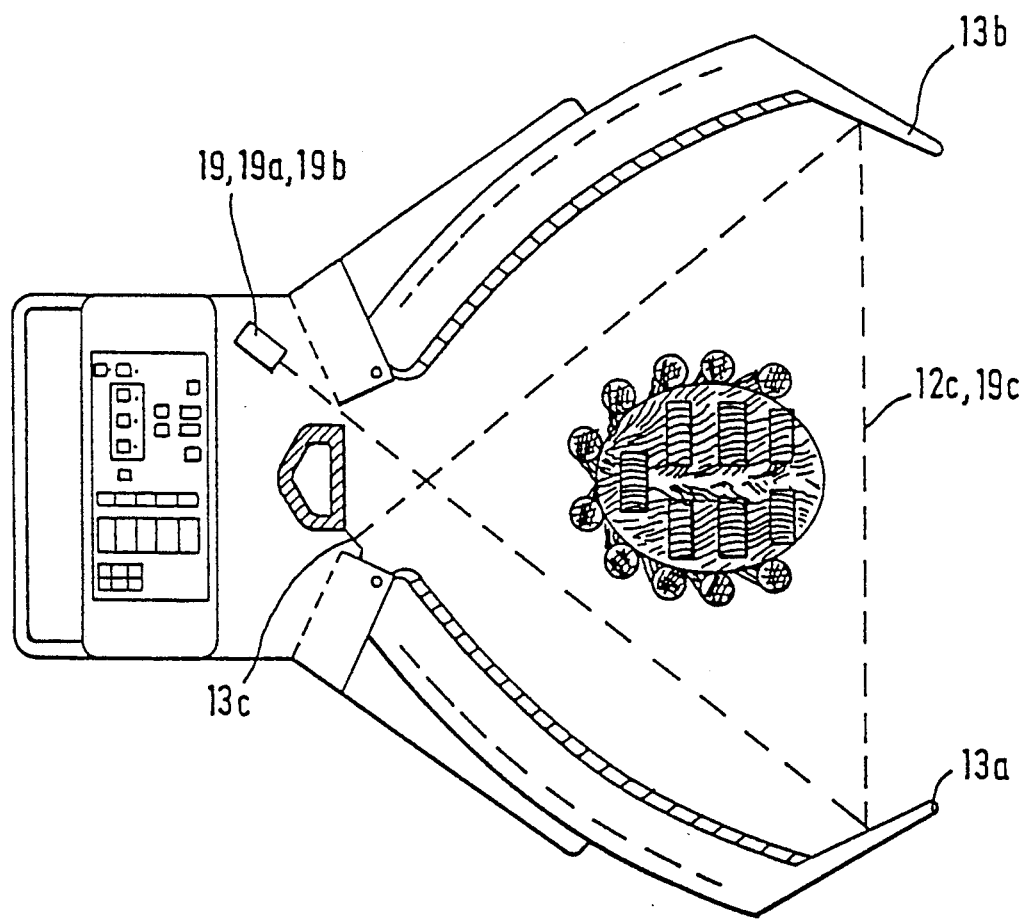
FIG. 3 shows a top view of a treatment device with an ultrasonic sensor whose horizontally radiated measurement signal is received by it again after repeated reflection.

The same measurement method can also be applied in another advantageous construction of the treatment device 1 according to the invention. This construction makes it possible to determine the position of the head in a plurality of directions with one measurement signal 12c by a multiple reflection of the measurement signal 12c (FIG. 3). The measurement signals 12c radiated by the ultrasonic sensor 19 are first deflected one after the other at two reflectors 13a, 13b and then undergo an exact reversal of direction at a third reflector 13c, so that the measurement signal 12c arrives back at the ultrasonic sensor 19 again on the same path. The head position is accordingly detectable all around the horizontal plane.

Figure 4:
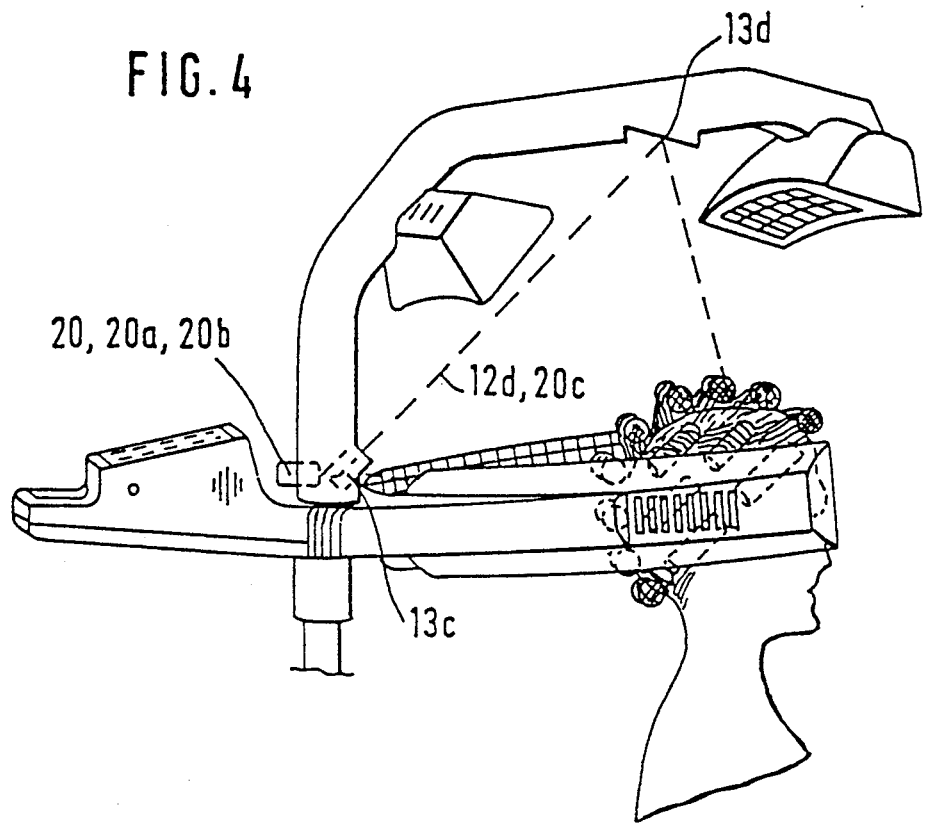
FIG. 4 shows a perspective view of a treatment device with an ultrasonic sensor whose measurement signal, which is deflected twice, reaches the hair from the top.
Figure 5:
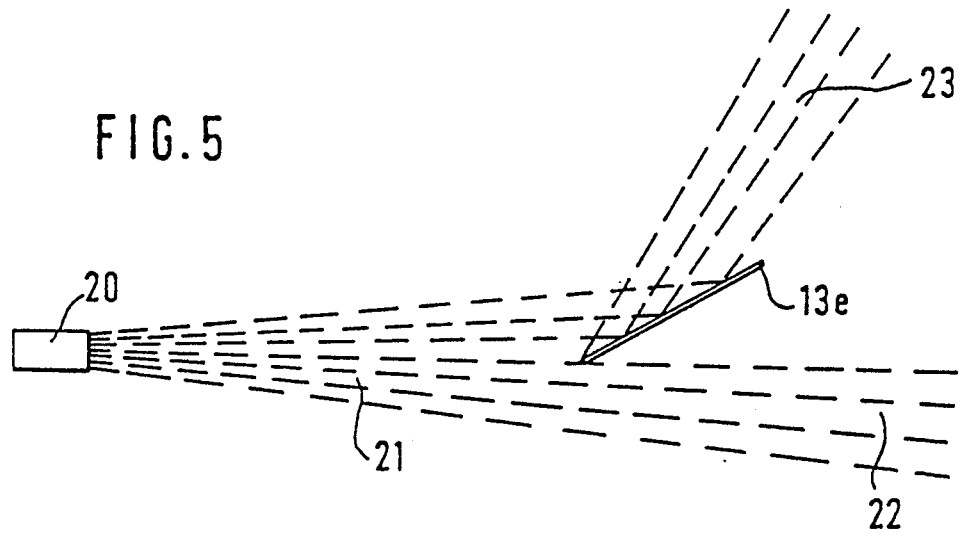
FIG. 5 shows a schematic view of the division of a sonic cone.

An exact height measurement of the head position can be effected by means of a measurement signal 12d which is aligned diagonally upward with the reflector 13d at the supporting arm 7 and reflected onto the head from the latter (FIG. 4). The vertical position of the head can accordingly be accurately determined with the above-described measurement process. The signal of the horizontally aligned ultrasonic sensor 20 is reflected diagonally upward by a reflector 13c. If the reflector 13e is pushed only partially into the ultrasonic cone 21, the cone is split up (FIG. 5) into a horizontal ultrasonic cone 22 and an ultrasonic cone 23 reflected diagonally upward. It is accordingly possible to monitor the position of the head with one ultrasonic sensor 19 (FIG. 3) or 20 (FIG. 4) in all movement directions.

Figure 6:
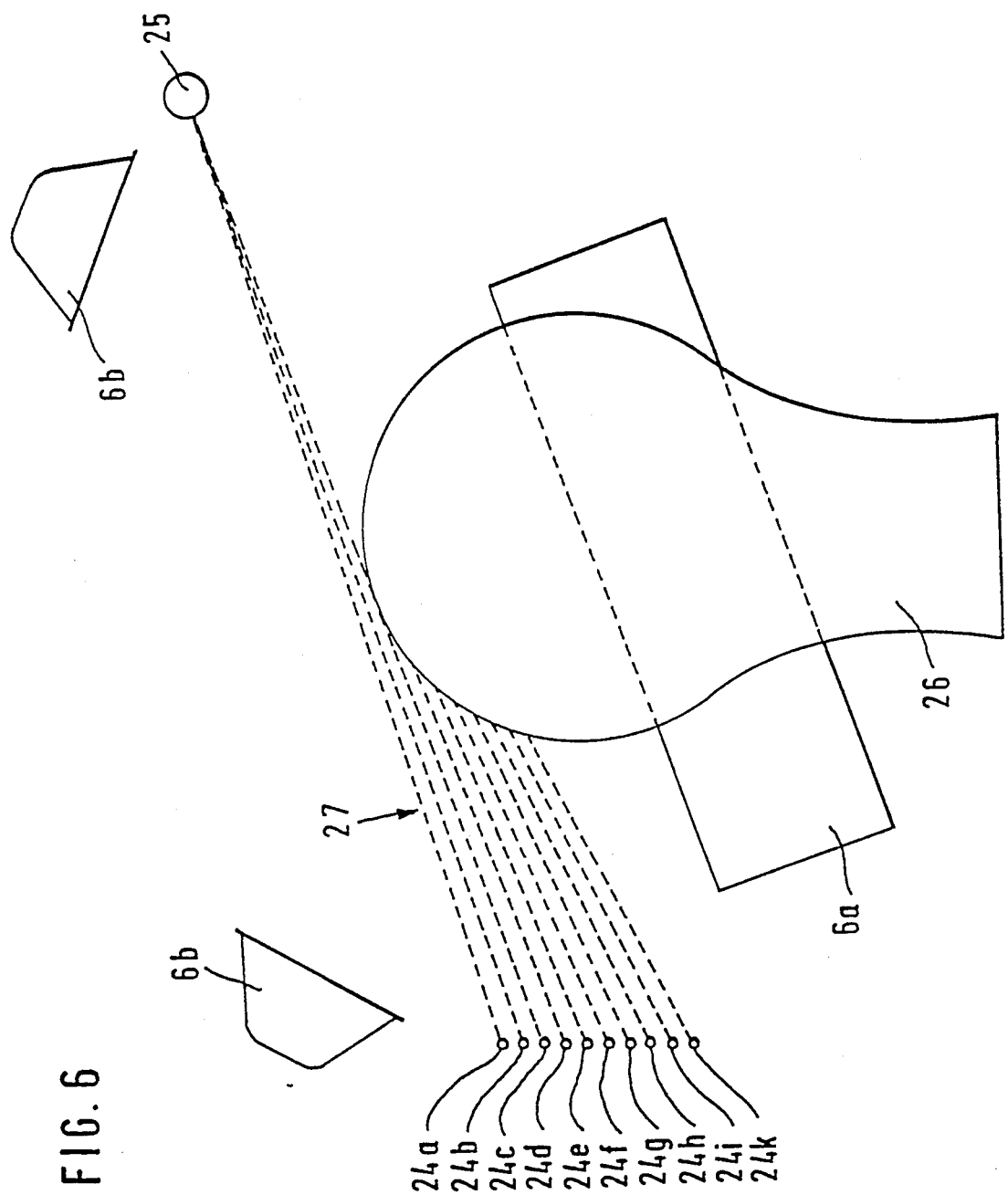
FIG. 6 shows a schematic view of a linear arrangement of a plurality of transmitters which are aligned with one receiver.

The position of the head 26 can be determined by measuring the energy of the infrared signal 27 striking the infrared receiver 25 by means of a linear arrangement of a plurality of infrared transmitters 24a-24k and their alignment with an individual infrared receiver 25 (FIG. 6). Individual infrared transmitters 24a-24k can also be switched on and off cyclically one after the other and the measured signal intensities are stored respectively. The stored values are then compared with the measured values of an optimal head position.

Figure 7:
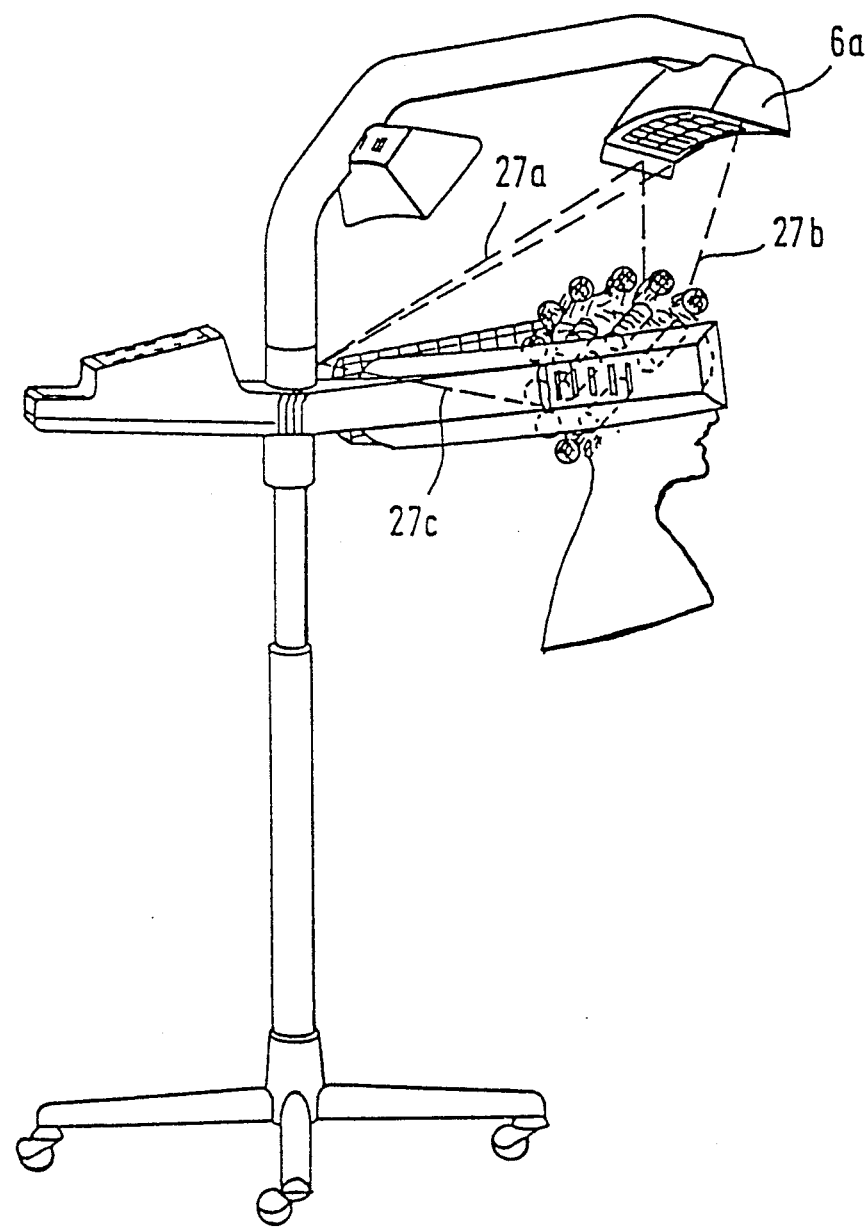
FIG. 7 shows a perspective view of a treatment device with a signal divided into three.

FIG. 7 shows a treatment device with three ultrasonic signals 27a, 27b, 27c for monitoring the head position as another embodiment example. Two emitted ultrasonic signals 27a, 27b are reflected by the hair near the forehead of the person to be treated. The infrared radiator 6a serves as another reflector. Due to the symmetrical beam guidance the reflected ultrasonic signals 27a, 27b strike the ultrasonic sensor or sensors (not shown) simultaneously and in a constant manner with respect to time when the position of the head is correct. An incorrect position of the head can be deduced from different signal propagation times. A device, not shown, logically processes the measured signal propagation times and a warning is possibly issued. The third ultrasonic signal 27c is directed approximately to the neck area of the person to be treated. Accordingly, not only can an additional determination of position be effected, but also another distance measurement.

It will be understood that each of the elements described above, or two or more together, may also find a useful application in other types of constructions differing from the types described above.

While the invention has been illustrated and described as embodied in a treating device having an open design for human hair of the head, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Treatment device for human hair on a head, comprising support means; treating means mounted on said support means to provide a treatment of human hair on a head in a predetermined position; means for monitoring the position of the head, said monitoring means being mounted on said support means and including at least one transmitter and at least one receiver for respectively generating and receiving a measurement signal in dependence on the position of the head; and warning means for indicating undesirable head positions relative to the treating means in response to the measurement signal.

2. A treatment device as defined in claim 1; and further comprising at least one reflector arranged to deflect the measurement signal.

3. A treatment device as defined in claim 1, wherein said transmitter and said receiver are formed so that the measurement signal is an infrared radiation.

4. A treatment device as defined in claim 1, wherein said transmitter and said receiver are formed so that the measurement signal is an ultrasonic signal.

5. A treatment device as defined in claim 1, wherein said transmitter and said receiver together form one structural component part.

6. A treatment device as defined in claim 2, wherein said transmitter is oriented at an acute angle relative to a horizontal line and the reflector is arranged in the same direction, so that a surface normal to said reflector stands at a point of incidence of the measurement signal approximately parallel to said direction.

7. A treatment device as defined in claim 1, wherein said transmitter for the measuring signal is arranged horizontally.

8. A treatment device as defined in claim 1, wherein said transmitter for the measuring signal is arranged vertically.

9. A treatment device as defined in claim 2, wherein said reflector is partially inserted in a path of the measurement signal and a blanked out measurement signal has a clearly changed propagation direction after said reflector.

10. A treatment device as defined in claim 2, wherein said transmitter for the measuring signal is arranged horizontally, said reflector partially projecting into a propagation cone and turned diagonal relative to a horizontal plane so as to be arranged in the same direction; and further comprising another reflector which is fastened above a position of the head and reflects down on the hair, a deflected component of the measurement signal facing said another reflector.

11. A treatment device as defined in claim 1, wherein said warning means is an optical signal transmitter.

12. A treatment device as defined in claim 1, wherein said warning means is an acoustic signal transmitter.

13. A treatment device as defined in claim 1; and further comprising at least one additional infrared transmitter, said transmitters being arranged next to one another in a line and aligned with said infrared receiver.

14. A treatment device as defined in claim 1; and further comprising at least one additional infrared receiver, said infrared receivers being arranged next to one another in a line and aligned with said infrared transmitter.

15. Treatment device for human hair on a head, comprising treating means; means for monitoring a position of the head and including at least one transmitter and at least one receiver for respectively generating and receiving a measurement signal in dependence on the position of the head; and warning means for indicating undesirable head positions in response to the measurement signal, said treating means being formed as an infrared heat treatment device.

* * * * *